No. 799,516. PATENTED SEPT. 12, 1905.
W. L. BLISS.
TRAIN LIGHTING SYSTEM.
APPLICATION FILED APR. 27, 1904.
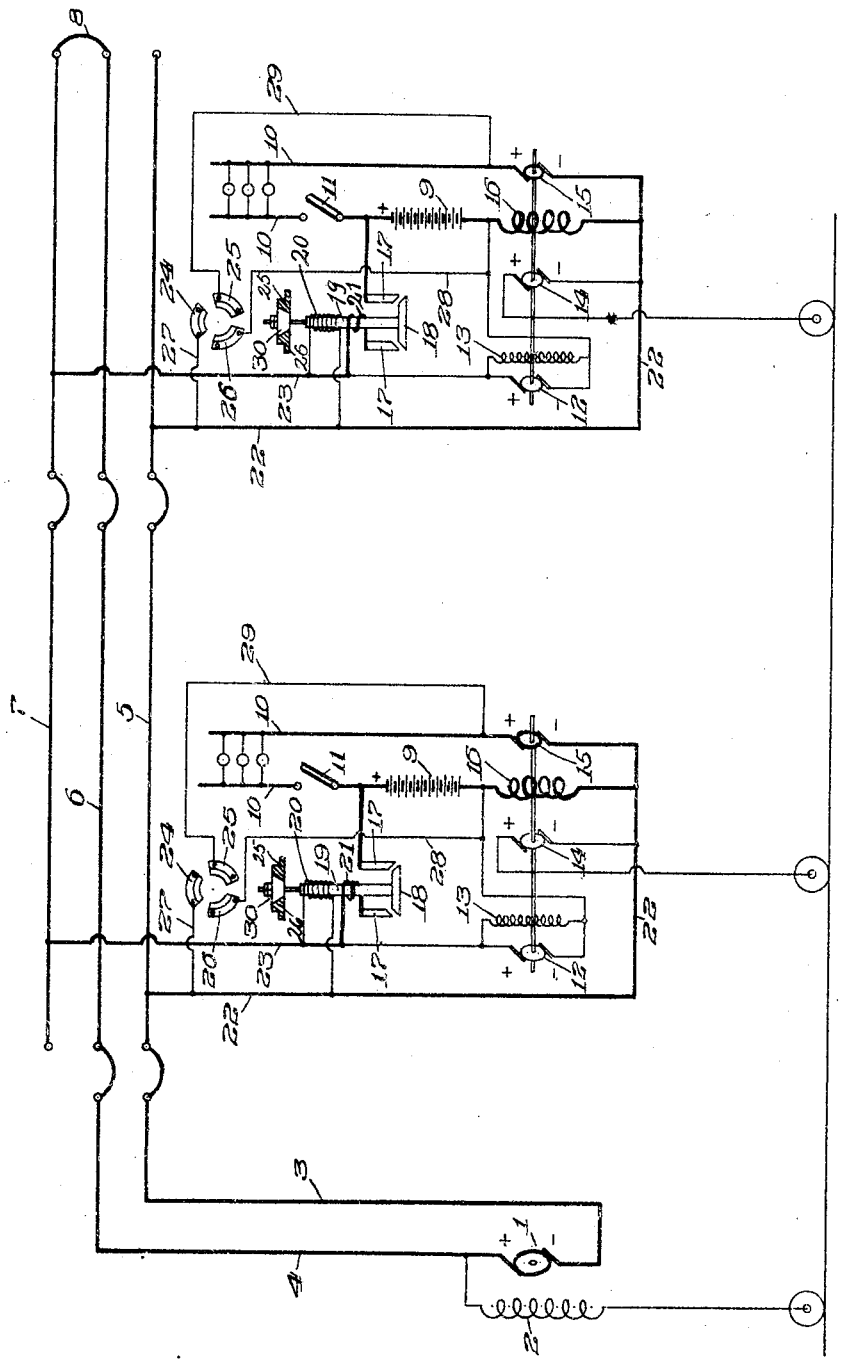
Witnesses:
Robert H. Weir
W. Perry Hahn
Inventor:
William L. Bliss
By: Jones & Addington
Attorneys

UNITED STATES PATENT OFFICE.

WILLIAM L. BLISS, OF NEW YORK, N. Y., ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,516.      Specification of Letters Patent.      Patented Sept. 12, 1905.

Application filed April 27, 1904. Serial No. 205,062.

*To all whom it may concern:*

Be it known that I, WILLIAM L. BLISS, a citizen of the United States, residing at New York, in the county of New York and State of New York, have invented new and useful Improvements in Train-Lighting Systems, of which the following is a full, clear, concise, and exact description, reference being had to the accompanying drawing, forming a part of this specification.

My invention relates to a lighting system, more particularly adapted for the lighting of cars run in trains, although certain features of the invention are applicable to other purposes.

In the lighting of trains by the generation of current on the train two systems have been principally employed. In one system a generator driven by a prime mover, such as a steam or gas engine, is located in one of the cars of the train—as, for instance, the baggage-car—and current is thus generated which is supplied to a train-circuit extending throughout the train. Systems of this kind are objectionable for a number of reasons, principal among which is the fact that they require an engineer or attendant constantly at hand to operate the engine and generator. The second system, to which the present invention relates, employs a generator which receives its motion from the movement of the train and is associated with a storage battery, so that the lamps may be supplied through the conjoint action of the generator and the storage battery. When the car is at rest during the day-time, both the generator and the storage battery may be rendered inert. When the car is at rest at night, the lamps may be energized by means of the storage battery, and while the train is in motion at night the lamps may be energized through the agency of the generator alone or through the agency of the storage battery, or through the conjoint action of both. It has been customary with these axle-driven systems to provide automatic means whereby the generator and storage battery are caused to act in harmony in furnishing energizing-current to the lamps. In car-lighting systems of this character wherein the generator is geared to the axle of the car to receive motion from the movement of the train it has been the practice to provide a complete lighting system upon each car, whereby each car becomes a unit in itself, so far as lighting is concerned. This requires that each car be equipped with a generator suitably geared to one of the axles of the car, with a storage battery, and with suitable automatic regulating mechanism to cause the generator and storage battery to properly coöperate in furnishing the energizing-current for the lamps.

It is the object of the present invention to provide means whereby a single generator may be employed for a plurality of cars in a train, and to this end the generator may be mounted upon the locomotive, the tender, or, if preferred, upon one of the cars of the train, the generator being suitably geared with a moving part of the train—as, for instance, one of the axles—so as to receive motion therefrom. Upon each car I provide a storage battery and also a regulating mechanism which is so constructed and arranged that any number of cars may be connected in the train and the regulating mechanism of the several cars will act conjointly and in harmony to govern the single generator which supplies current to the entire train.

In train-lighting systems employing the axle-driven generator it is apparent that the voltage of the current developed by the generator will tend to rise as the speed of the train increases. In order that the generator may have its output confined within safe and predetermined limits at high speeds and yet develop an operative voltage at as low a speed as consistent with economic design, it is necessary to provide some automatic regulating mechanism whereby the voltage and output of the generator are properly confined within such safe and predetermined limits, notwithstanding the excessive variation of speed to which the generator is subjected. The voltage of the generator is dependent upon the speed, the strength of the magnetic field, and the number of armature-conductors cutting the magnetic field. Accordingly the voltage may be altered by varying any one of these quantities. The armature-conductors of a generator are in general a fixed quantity, and accordingly the voltage in practice is varied by a change of speed or a change of field strength. Inasmuch as the varying speed of the car tends to produce a varying voltage at the terminals of the generator, it is apparent that the most convenient manner of compensating for this change of speed and voltage is to vary the strength of the field inversely as the speed varies. The most practicable manner of varying the strength of the magnetic field is by varying the strength of the current in the field-winding, and this is the plan which has usually been adopted in practice in connection with car-lighting systems.

In accordance with my invention in its preferred form I provide upon a plurality of cars of a train an automatic regulator which serves to vary the strength of the energizing-current of the field-magnet of the single generator in approximately inverse proportion to the change of speed of the generator. I am thus enabled to confine the voltage of the generator within certain predetermined limits.

The automatic regulators carried upon the cars may take any one of a number of forms, all of which are equivalents so far as the ultimate result is concerned. In the preferred embodiment of my invention I provide upon each car a regulator in the form of a counter-electromotive-force device, technically known as a "bucker," which is adapted to create a counter electromotive force which will oppose the current which is ordinarily passed through the field-winding generally due to the generator voltage and reduce the strength of the energizing-current in the field-winding in the desired proportion to the increase of speed of the generator as the train speed increases. In this manner I am enabled to maintain the generator voltage within prearranged limits regardless of changes in speed. The regulators upon the various cars are so arranged relatively that they will in any number act conjointly and in harmony in regulating the single generator which supplies current to the several cars comprising the train. It is of course apparent that it is not essential that every car of the train should be provided with an automatic regulator, but merely that sufficient cars be so provided to effect the automatic regulation contemplated, as will be more particularly hereinafter explained.

For the purpose of disclosing the essential requirements of my invention I have illustrated one embodiment thereof in connection with a system which has been developed for practical use; but it will be understood that while I have thus selected one form of the invention for explanation the invention is susceptible of various other embodiments, as will readily appear to one skilled in the art.

Referring to the drawing, in which like numerals indicate like parts throughout, I have illustrated diagrammatically a car-lighting system embodying the general features of my invention.

The generator is provided with an armature 1 and a field-winding 2 and is mounted upon the locomotive, tender, or, if preferred, upon one of the cars of the train, and the armature thereof is suitably geared with an axle or moving part of the train to receive motion therefrom. The brushes of the armature are connected with the supply-mains 3 4 of the train-circuit, which extends throughout the train. The distribution of electrical energy throughout a long train composed of a number of cars is an important consideration, and it is desirable that the voltage on the train-lines in each car at the points of distribution shall be uniform. This can be effected in several ways. The train-lines can be of sufficient cross-section and the connecting devices between the cars can be made of such low resistance that the drop throughout the entire length of the train shall be negligible. The first cost of this construction is of course very high, and I preferably employ three train-lines or main conductors 5 6 7, extending throughout the train, one of which, 6, serves as an end feeder and is connected at the end of the train farthest from the generator to one of the remaining conductors 7 by a connector or jumper 8. The supply-mains 3 4 are connected, respectively, with the train-lines 5 6, and the car-mains are connected between the train-lines 5 and 7. Thus equal voltages appear at the points of distribution or points of attachment between train-lines and car-mains.

Upon each car is mounted a storage battery 9, between the terminals of which the lamp-circuit 10 10 is connected, a hand-switch 11 being provided for opening and closing the lamp-circuit. Upon each car is also carried a counter electromotive force device or bucker consisting of a shunt-motor having an armature and commutator 12 and field 13 and a double-wound armature and commutators 14 15, respectively, adapted to be rotated by the armature of the motor within a magnetic field created by the series field-winding 16. Current admitted to the armature 12 and field 13 of the shunt-motor causes the same to operate normally at a practically constant speed, thereby rotating the armature-winding 14 and 15 at a constant speed within the magnetic field created by the series field-winding 16. The armature-windings 14 and 15 thus create counter electromotive forces, which are utilized as hereinafter explained.

An automatic generator-switch is provided for connecting the generator with the storage battery and lamp-circuit, and this switch consists of a pair of stationary contacts 17 17 and a movable contact 18, carried upon the core 19 of a solenoid having two windings 20 and 21. The winding 20 is of fine wire and is connected directly between the car-mains 22 23 of the car-circuit. The winding 21 is made of coarse wire and is connected in series with the switch-contacts 17 17 18 and carries the total current supplied to the car. When current flows through this coil from the train-lines to the apparatus on the car, it assists the coil 20 in maintaining a firm contact.

The armature-winding 14 is connected between car-main 22 of the car-circuit and the conducting-framework of the car. The field-winding 2 of the generator is connected between the supply-main 4 and the conducting-frame of the locomotive, tender, or car upon which the generator is mounted. Thus it will be seen that the armature-windings 14 of the several cars are in parallel with one another, and together they are in series with the field-coil 2 of the generator. It is also apparent that if the different and several armature-windings 14 are revolved at equal speeds in equal magnetic fields 16 or if said armature-windings 14 be revolved at varying speeds in correspondingly-varying magnetic fields 16 then the combined voltage developed by the armatures 14 in parallel will be equal to their individual voltages. As the combined voltage of any number of armature-windings 14 in parallel will be equal to the combined voltage of any other number of armature-windings 14 in parallel, the effect of such combined or individual or group voltage of armature-windings 14 will have substantially the same effect in the circuit of the generator field-winding 2, since the internal resistance of the armature-windings 14 is very low compared with the resistance of the generator field-winding. Therefore under the proper conditions of adjustment the regulating armature-windings 14 are non-interfering and but slightly and advantageously accumulative in their action, since there is a slight reduction of resistance in the generator field-circuit by paralleling the armature-windings 14. Consequently as cars are added to the train the regulation of the generator so far as compensating the field strength for variations in train speed remains quite as effective no matter how many cars are added to or subtracted from the train, provided, of course, one car is always in the train equipped with a regulating armature-winding 14.

When cars are added to the train, the output of the generator will increase to supply the increased demand for current, because the train-circuit will have the resistance thereof decreased by the addition of new parallel circuits across the same, and likewise when cars are taken from the train the output of the generator will be decreased in accordance with the decrease in the demand for current, because the train-circuit will have the resistance thereof increased by the removal of parallel circuits from across the same. As field-winding 16 is arranged across the train-line or main circuit, the current to which it is subjected is independent of the current flowing through said main circuit to the other cars. The generator may therefore vary the output thereof upon changes in the number of cars in the train without thereby causing the current in said field-winding to be varied. If said field-winding were subjected to variations in current under such conditions, it would cause the field strength of the generator to be so altered that the generator would be incapable of delivering sufficient current for a larger number of cars, and it would perhaps deliver an excessive current for a lesser number of cars.

I have illustrated the armature-winding 14 and the field 2 diagrammatically as connected with wheels of the vehicle running upon the rail. I preferably utilize the rails and metallic framework of the cars as a conductor for this purpose, as it avoids the running of an additional conductor throughout the train, although it will be undersood that a special conductor may be provided for this purpose, if desired.

Each of the cars of the train is provided with apparatus similar to that above described. I have illustrated in the drawing but two such cars; but it will be understood that any number of cars may be connected in the train.

A short-circuiting switch in the form of a socket consisting of three segments 24 25 26 is provided for short-circuiting the armature 15 and the series field 16 under certain conditions, as hereinafter described. The segment 24 is connected by a conductor 27 to the car-main 22 of the car-circuit, the segment 26 is connected by conductor 28 to one side of the series field-winding 16, and the segment 25 is connected, by means of conductor 29, with one side of the armature 15. The connection of the segment 24 with main 22, in effect, connects said segment 24 with the opposite side of the series field-windings 16 and the armature 15, so that when the segments are electrically united through the agency of the conical plug 30 the series field 16 and the armature 15 are short-circuited. The reason for this is explained later on.

If the car is at rest and it is desired to light the lamps, the switch 11 may be closed to connect the lamp-circuit 10 10 with the storage battery 9, and the battery will thus furnish current for lighting the lamps. If now the train be started, the armature 1 of the generator will commence to rotate and will develop a voltage which will be impressed upon the supply-mains 3 4 and through train-lines 5 6 7 to car-mains 22 and 23. In practice I preferably employ thirty-two cells of storage battery having a normal voltage of sixty-four volts, and the generator is so designed and so geared to the axle that when running at five hundred revolutions per minute, corresponding with a train speed of about twenty miles per hour, it generates sixty-four volts. If now the train should increase its speed until it reached about sixty miles per hour, the armature of the generator would be making about fifteen hundred revolutions per minute. All other conditions remaining the same, the voltage of the generator would of course be proportional to its speed, and hence the voltage at the terminals would rise to about one hundred and ninety-two volts. It will be sufficient, however, to have the generator increase its voltage to eighty volts at maximum speed, as this would be approximately two and one-half volts per cell, which is ample to force the full charging-current through the battery. The winding 20 of the solenoid-switch is so adjusted that when the generator develops sixty-four volts the core 19 will be raised, thereby closing switch 18 against contacts 17 17 to complete the continuity of the circuit between the generator, the storage battery, and the lighting-circuit. The circuit through the solenoid may be traced from the armature 1 over conductors 4 6 8 7 23, solenoid-winding 20, and conductors 22 and 3, back to the armature of the generator. When the switch 18 has been closed, the circuit from the generator may be traced over conductors 4, 6, 7, and 23, thence through the coarse-wire winding 21, contacts 17 18 17 of the switch, thence dividingly through the battery-circuit 9 and series field 16, and also through the lamp-circuit 10 10 and armature-winding 15, reuniting in conductors 22 and 3, back to the armature of the generator. As long as the voltage developed by the generator and that developed by the storage battery are substantially equal the generator and battery will coöperate in supplying current to the lighting-circuit. As the speed of the train, and consequently the speed of the generator-armature, increases, the generator-armature will develop more than sixty-four volts, and accordingly the generator will send current through the storage battery, as well as through the lamp-circuit. The voltage of the generator will continue to increase with increasing speed; but after the closing of the automatic switch and the freeing of the counter-electromotive-force devices by the removal of the short-circuiting plug from the triple conical seat the generator voltage is prevented from increasing as fast as the speed increases. In practice it is found that if the generator voltage be allowed to increase about twenty-five per cent. in value—that is, from sixty-four to eighty volts—while the speed increases from five hundred revolutions per minute at twenty miles per hour to fifteen hundred revolutions per minute at sixty miles per hour, an increase of three hundred per cent. in speed, the best results will be attained and the voltage will have risen sufficiently to charge the storage battery at normal rate. This is accomplished through the agency of the bucker-armature 14. The circuit through the field-winding 2 of the generator may be traced from the armature 1 through field-winding 2 to the conducting-frame of the tender, thence by means of the rail or the metallic framework of the train to armature 14, thence by conductors 22 and 3 to the opposite side of the generator-armature. The armature 14 is thus connected in series with the field-winding 2 of the generator. Current flows through the armature 12 and shunt-field 13 of the motor part of the bucker and causes said armature to rotate at practically constant speed after the voltage has risen to a sufficient degree to cause the operation of the automatic switch, which connects the generator in circuit. The circuit through the motor may be traced from supply-conductor 23 through armature 12 and shunt-field 13 in parallel and back to the opposite main 22 through series field-winding 16 if the automatic switch has closed the generator-circuit and if not through conductors 28 and 27 and the segments 26 and 24 of the segmental socket. In thus completing the circuit of the motor through the series coil 16 instead of connecting it directly to the main 22, as would at first most naturally appear, certain effects are produced which are described in an application filed by me July 2, 1904, Serial No. 215,085, and are not herein specifically claimed. The shunt-motor thus starts in operation as soon as the generator begins to impress a voltage upon the supply-circuit; but the bucker-armatures 14 and 15 do not commence to develop counter electromotive forces until the automatic switch 18 has been closed. To render these buckers inert during this initial period of starting, the triple-contact switch is provided, and it will be noted that when the switch 18 is open the conical plug 30 of this triple-contact switch rests in engagement with the segments 24, 25, and 26, thus short-circuiting armature 15 and series field 16. As long as field 16 is short-circuited the rotation of the armature-windings 14 and 15 produces no counter electromotive forces. When, however, the automatic switch is operated to connect the generator with the storage battery and lighting-circuit, the conical plug 30 is raised out of engagement with the segments of the triple-contact switch and the series field 16 and the armature 15 are operatively connected in circuit. Accordingly the rotation of the armature-winding 14 in the field of the series field-winding 16 produces an electromotive force which acts in opposition to the electromotive force impressed by the generator-armature 1, which sends current through the field-winding 2. Inasmuch as the current through the series field-winding 16, which is the charging-battery current, varies in accordance with the change of voltage impressed upon the circuit by the generator, the counter electromotive force developed by the armature 14 will vary in exact accordance with the change of voltage developed by the generator. Such increase in voltage will increase the strength of the field developed by the field-winding 16 and the counter electromotive force developed by the armature 14 will increase in proportion and will reduce the strength of the current flowing through the field-winding 2 of the generator to the same extent. Consequently the strength of the field-magnet of the generator decreases in such accordance with the increase of speed of the generator that the voltage developed by the generator thus remains within predetermined limits. The bucker-armature 14 thus serves to regulate the voltage developed by the generator within safe limits regardless of the extent to which the speed varies.

The current which the generator sends to the storage battery will increase in almost direct proportion to the rise in the voltage of the generator above the normal voltage of the storage battery. As the field-winding 16 is arranged in series with the storage battery, it will be subjected to considerable variations in current upon slight variations in the speed of the generator, and consequently it will be very effective in controlling the regulation of the generator. The field-winding 16 is illustrated in the drawings as being arranged directly in the battery-circuit. The advantages which arise from this specific arrangement of said winding are set forth and claimed in another application, which was filed by me July 20, 1904, and bears Serial No. 217,386. It will be understood that the present invention contemplates other arrangements of said field-winding, so long as said winding is subjected to variations in current as distinguished from variations in voltage, upon variations in the speed of the generator without being subjected to variations in current upon changes in the number of cars in the train. Although it is preferable to provide each car with a regulator which is adapted to operate independently or in conjunction with the other regulators, it will be understood that in certain instances the invention contemplates merely a single regulator.

The armature 15, which I term the "lamp-bucker," serves to maintain the voltage on the lamp-circuit practically constant regardless of the number of lamps in circuit and regardless of changes in the voltage at the terminals of the battery. It has been found that the voltage at the terminals of a battery on charge rises about in proportion to the current forced through the battery. Inasmuch as the series field 16 of the bucker is in series with the battery when the generator is sending current therethrough, the magnetism of this series field will increase in proportion to the charging-current passing through the battery. Accordingly as the voltage of the battery increases the strength of the field developed by the series field 16 increases and the counter electromotive force developed in the armature 15 is likewise increased. The counter electromotive force of armature 15 acts in opposition to the current flowing through the lamp-circuit, and accordingly the counter electromotive force increases in exact proportion to the increase of voltage at the terminals of the battery. Accordingly the voltage to which the lamps are subjected remains practically constant regardless of the number of lamps in use or the speed of the train.

After the counter-electromotive-force devices or buckers 14 and 15 have been started by the motor the same absorb electrical energy from the system and operate as motors. The motor is then relieved of its load and driven by the counter-electromotive-force devices. In consequence it becomes a generator and restores to the system a portion of the electrical energy consumed by the counter-electromotive-force devices.

It will be understood that the dynamo-electric machines upon each car for regulating the generator and for regulating the lamp voltage may be combined into a unitary structure or that the same may be independent machines.

When the speed of the train decreases to such a degree that the voltage of the generator falls below the prearranged minimum voltage—that is, sixty-four volts—the storage battery discharges and sends current back through the generator, and this current flowing through the series winding 21 of the solenoid-switch neutralizes the effect of winding 20 and the core 19 drops, thus separating the switch-contacts 17 18 and disconnecting the generator from circuit.

While I have described my invention in connection with one form of automatic regulating means—to wit, the counter-electromotive-force devices—it will be understood that my invention is not limited to these specific devices, as any other equivalent mechanism capable of accomplishing the same result may be substituted therefor. Instead of using an automatic switch having the windings arranged as above described any other form of automatic switch for connecting and disconnecting the generator may be employed. Likewise instead of using the bucker for regulating the strength of the field of the generator any other suitable device for similarly regulating the strength of the field may be employed, and instead of regulating the generator by acting upon the field strength thereof it is apparent that the voltage of the generator may be regulated in any other equivalent manner. Instead of employing the bucker for maintaining the voltage of the lighting-circuit practically constant any other form of regulator may be employed for this purpose which will accomplish the same result within the limits permissible in practice.

Having described my invention, what I claim as new, and desire to secure by Letters Patent, is—

1. In a train-lighting system, in combination, a generator driven at a variable speed and carried upon a unit of the train, means for regulating said generator to confine the output thereof within prearranged limits, said means being so arranged in circuit as to be subjected to variations in current upon variations in the speed of said generator without being subjected to variations in current upon changes in the number of cars in the train, means for furnishing current to said translating devices when said generator is inoperative, and means carried upon each of said units for regulating the voltage impressed upon said translating devices.

2. In a train-lighting system, in combination, a generator driven at a variable speed and carried upon a unit of the train, a storage battery and translating devices carried upon each of a plurality of units of the train, a regulator for regulating said generator to confine the output thereof within prearranged limits, said regulator being provided with an electromagnet for controlling the operation thereof, and said magnet being so arranged in circuit as to be subjected to variations in current upon variations in the speed of said generator, without being subjected to such variations in current as result from changes in the number of cars in the train, automatic means for connecting said storage batteries and said translating devices to said generator and disconnecting the same therefrom, and automatic means carried upon each of said plurality of units for regulating the voltage impressed upon said translating devices.

3. In a train-lighting system, in combination, a generator driven at a variable speed and carried upon a unit of the train, a storage battery and translating devices carried upon each of a plurality of units of the train and connected to said generator, said storage batteries and translating devices being arranged in circuit in parallel, a regulator operatively arranged in circuit with said generator to confine the output thereof within prearranged limits, said regulator being provided with an electromagnet for controlling the operation thereof and said magnet being arranged in circuit in series with the battery upon one of said units and in parallel with the batteries and translating devices upon the other units, and automatic means carried upon each of said plurality of units for regulating the voltage impressed upon said translating devices.

4. In a train-lighting system, in combination, a generator driven at a variable speed and carried upon the tender of the locomotive, a storage battery and translating devices arranged upon a car, means carried by said car for regulating said generator to confine the output thereof within prearranged limits, said means being provided with an electromagnet for controlling the operation thereof and said magnet being arranged in circuit in series with said storage battery, a storage battery and translating devices carried upon each of other cars and arranged in circuit in parallel with said magnet, a train-circuit extending through said train and having said storage batteries and said translating devices connected thereto, and automatic means carried upon each of said cars for regulating the voltage impressed upon said translating devices.

5. In a train-lighting system, in combination, a generator driven at a variable speed, a local circuit arranged upon a unit of the train, a storage battery and translating devices arranged in said local circuit, a regulator operatively arranged in circuit with said generator to regulate the same and thereby confine the output thereof within prearranged limits, said regulator being provided with an electromagnetic winding for controlling the operation thereof and said winding being arranged in said local circuit in series with said storage battery, a storage battery and translating devices carried upon each of other units of the train and connected to the local circuit arranged upon the unit of the train therewith, said local circuits all being connected to said generator in parallel, and an automatic regulator carried upon each of said units and operatively arranged in circuit to regulate the voltage impressed upon said translating devices.

6. In a train-lighting system, in combination, a generator driven at a variable speed and carried upon the tender of the locomotive, a storage battery and translating devices carried upon a car, an automatic regulator operatively arranged in circuit with said generator to regulate the same and thereby confine the output thereof within prearranged limits, said regulator being provided with an electromagnetic winding for controlling the operation thereof, said winding being arranged in circuit in series with said storage battery, a storage battery and translating devices carried upon each of other cars, a local circuit arranged upon each of said cars and having the storage battery and the translating devices upon the car therewith connected thereto, said local circuits being connected to said generator in parallel with each other, and an automatic regulator carried upon each car and operatively arranged in circuit to regulate the voltage impressed upon said translating devices.

7. In a train-lighting system, in combination, a generator driven at a variable speed and carried upon one of the units of the train, a storage battery and translating devices carried upon another unit of the train, a regulator carried upon the last-mentioned unit of the train and operatively arranged in circuit with said generator to regulate the same and thereby confine the output thereof within prearranged limits, said regulator being provided with an electromagnetic winding for controlling the operation thereof and said winding being arranged in circuit in series with said storage battery, and a storage battery and translating devices carried upon each of other units of the train and connected in circuit in parallel with said winding, and an automatic regulator arranged upon each unit carrying a storage battery and operatively arranged in circuit to regulate the voltage impressed upon said translating devices.

8. In a train-lighting system, in combination, a generator driven at a variable speed, a storage battery and translating devices carried upon each of a plurality of units of the train, a dynamo-electric machine operatively arranged in circuit with said generator to regulate the same and thereby confine the output thereof within prearranged limits, said machine being provided with a field-winding for controlling the operation thereof and said winding being so arranged in circuit as to be subjected to variations in current upon variations in the speed of said generator without being subjected to variations in current upon changes in the number of units of the train, whereby said dynamo-electric machine will be very effective in regulating said generator and said generator may make the output thereof suitable for any number of cars, and an automatic regulator carried upon each of said units for regulating the voltage impressed upon said translating devices.

9. In a train-lighting system, in combination, a generator driven at a variable speed, a storage battery and translating devices carried upon each of a plurality of units of the train, a dynamo-electric machine arranged in circuit to introduce a counter electromotive force into the field-circuit of said generator and thereby regulate said generator to confine the output thereof within prearranged limits, said dynamo-electric machine being provided with a field-winding for controlling the operation thereof and said field-winding being arranged in circuit in series with any one of said storage batteries, and automatic means carried upon each of said units for regulating the voltage impressed upon said translating devices.

10. In a train-lighting system, in combination, a generator driven at a variable speed, translating devices carried upon each of a plurality of units of the train, means for accumulating electrical energy while the generator is operative and operating said translating devices while said generator is inoperative, and means for introducing a counter electromotive force into the circuits of the translating devices to regulate the voltage impressed thereon.

11. In a train-lighting system, in combination, a generator driven at a variable speed, a storage battery and translating devices carried upon each of a plurality of units of the train and connected to said generator in parallel, a dynamo-electric machine carried upon each of said units and operatively arranged in circuit to introduce a counter electromotive force into the circuit of the translating devices upon the unit of the train therewith and thereby regulate the voltage impressed upon said translating devices.

12. In a train-lighting system, in combination, a generator driven at a variable speed, a storage battery and translating devices carried upon each of a plurality of units of the train, an automatic regulator operatively connected in circuit with said generator to regulate the same and thereby confine the output thereof within prearranged limits, said regulator being provided with an electromagnetic winding for controlling the operation thereof and said winding being so arranged in circuit as to be subjected to variations in current upon variations in the speed of the generator without being subjected to variations in current upon changes in the number of units in the train, and means for introducing a counter electromotive force into the circuits of the translating devices upon the several units to regulate the voltage impressed upon the same.

13. In a train-lighting system, in combination, a generator driven at a variable speed, a storage battery and translating devices carried upon each of a plurality of units of the train, an automatic regulator operatively connected in circuit with said generator to regulate the same and thereby confine the output thereof within prearranged limits, said regulator being provided with an electromagnetic winding for controlling the operation thereof and said winding being so arranged in circuit as to be subjected to variations in current upon variations in the speed of the generator without being subjected to variations in current upon changes in the number of units in the train, a dynamo-electric machine carried upon each of said units and operatively arranged in circuit to introduce a counter electromotive force into the circuit of the translating devices upon the unit of the train therewith in proportion to the rise in voltage of the generator in charging the battery and thereby maintain substantially constant voltage upon said translating devices.

14. In a train-lighting system, in combination, a generator driven at a variable speed, means for regulating said generator to confine the output thereof within prearranged limits, and an equipment for each car containing a storage battery and translating devices connected to said generator, and a dynamo-electric machine operatively arranged in circuit to introduce a counter electromotive force into the circuit of said translating devices and thereby regulate the voltage impressed thereon.

15. In a train-lighting system, in combination, a generator driven at a variable speed, a storage battery and translating devices carried upon each of a plurality of units of the train and connected to said generator, and a regulator carried upon each of said units and operatively arranged in circuit with said generator to regulate the same and thereby confine the output thereof within prearranged limits.

16. In a train-lighting system, in combination, a generator driven at a variable speed, a storage battery and translating devices carried upon each of a plurality of units of the train and connected to said generator, an automatic regulator carried upon each of said units and adapted to be operatively connected in circuit with said generator to regulate the same and thereby confine the output thereof within prearranged limits, any one of said regulators being adapted to properly regulate said generator.

17. In a train-lighting system, in combination, a generator driven at a variable speed, a regulator carried upon each of a plurality of units of the train and operatively arranged in circuit with said generator to regulate the same and thereby confine the output thereof within prearranged limits, said regulators being arranged in circuit in parallel with each other.

18. In a train-lighting system, in combination, a generator driven at a variable speed, a storage battery and translating devices carried upon each of a plurality of units of the train and connected to said generator, a regulator carried upon each of said units of the train and operatively connected in circuit with said generator to regulate the same and thereby confine the output thereof within prearranged limits, said regulators being adapted to operate individually or collectively in regulating said generator.

19. In a train-lighting system, in combination, a generator driven at a variable speed, a storage battery and translating devices carried upon each car, an automatic regulator also carried upon each car and means for connecting each said regulator to said generator to regulate the same.

20. In a train-lighting system, in combination, a generator driven at a variable speed, a storage battery and translating devices carried upon each of a plurality of cars, an automatic regulator carried upon each of said cars and adapted to be connected in circuit with said generator to regulate the same and thereby confine the output thereof within prearranged limits, each regulator being provided with an electro-magnetic winding for controlling the operation thereof, and said winding being arranged in circuit in series with the storage battery upon the car therewith.

21. In a train-lighting system, in combination, a generator driven at a variable speed, a storage battery and translating devices carried upon each of a plurality of cars and connected to said circuit, a regulator carried upon each of said cars and adapted to be connected in circuit with said generator to regulate the same and thereby confine the output thereof within prearranged limits, another regulator carried upon each of said cars and connected in circuit to regulate the voltage impressed upon the lamps upon the car therewith.

22. In a train-lighting system, in combination, a generator driven at a variable speed, a storage battery and lamps carried upon each of a plurality of units of the train and connected to said generator, a dynamo-electric machine carried upon each of said units and adapted to be operatively connected in circuit with said generator to regulate the same and thereby confine the output thereof within prearranged limits.

23. In a train-lighting system, in combination, a generator driven at a variable speed, a storage battery and translating devices carried upon each of a plurality of units of the train and connected to said generator, a dynamo-electric machine carried upon each of said units and adapted to be connected in circuit with said generator to introduce a counter electromotive force into the field-circuit thereof and thereby regulate the same.

24. In a train-lighting system, in combination, a generator driven at a variable speed, a storage battery and translating devices carried upon each of a plurality of units of the train and connected to said generator, a dynamo-electric machine carried upon each of said units and adapted to be connected in circuit with said generator to introduce a counter electromotive force into the field-circuit thereof and thereby regulate the same, said dynamo-electric machines being arranged in circuit in parallel with each other.

25. In a train-lighting system, in combination, a generator driven at a variable speed, a storage battery and translating devices carried upon each of a plurality of units of the train and connected to said generator, a dynamo-electric machine carried upon each of said units and having the armature thereof connected in the field-circuit of said generator to introduce a counter electromotive force into said circuit, the field-winding of said dynamo-electric machine being connected in circuit in series with the storage battery upon the unit of the train therewith.

26. In a train-lighting system, in combination, a generator driven at a variable speed, a storage battery and translating devices carried upon each of a plurality of units of the train and connected to said generator, a dynamo-electric machine carried upon each of said units and having the armature thereof connected in the field-circuit of said generator to introduce a counter electromotive force into said circuit, the field-winding of said dynamo-electric machine being connected in circuit with the storage battery upon the unit of the train therewith and the armatures of the several dynamo-electric machines being arranged in parallel with each other.

27. In a train-lighting system, in combination, a generator driven at a variable speed, translating devices carried upon each of a plurality of units of the train, a dynamo-electric machine carried upon each of said units of the train and provided with a field-winding and a pair of armature-windings, one of said armature-windings being connected in circuit to regulate said generator and the other being connected in circuit to regulate the voltage impressed upon said translating devices, said field-winding being connected in circuit to be subjected to variations in current upon variations in the speed of said generator.

28. In a train-lighting system, in combination, a generator driven at a variable speed, a storage battery and translating devices carried upon each of a plurality of cars, a dynamo-electric machine carried upon each of said cars and provided with a field-winding and a pair of armature-windings, one of said armature-windings being connected in the field-circuit of said generator to vary the field strength of said generator and thereby regulate the same and the other being connected in circuit with said translating devices to regulate the voltage impressed thereon, said field-winding being arranged in circuit in series with the storage battery upon the car therewith.

29. In a train-lighting system, in combination, a generator driven at a variable speed, a storage battery and translating devices carried upon each of a plurality of units of the train, an automatic regulator carried upon each of said units and adapted to be operatively connected in circuit with said generator to regulate the same and thereby confine the output thereof within prearranged limits, any one of said regulators being adapted to properly regulate said generator, another regulator carried upon each of said units and operatively connected in circuit to regulate the voltage impressed upon the translating devices upon the unit therewith.

30. In a train-lighting system, in combination, a generator driven at a variable speed, a storage battery and translating devices carried upon each of a plurality of units of the train and connected to said generator, an automatic regulator carried upon each of said units and adapted to be operatively connected in circuit with said generator to regulate the same and thereby confine the output thereof within prearranged limits, said regulator being provided with an electromagnet for controlling the operation thereof and said winding being arranged in circuit in series with said storage battery so as to be subjected to variations in current upon variation in the speed of said generator, any one of said regulators being adapted to properly regulate said generator, and another automatic regulator carried upon each of said units and operatively connected in circuit to regulate the voltage impressed upon the translating devices upon the unit therewith.

31. In a train-lighting system, in combination, a generator driven at a variable speed, a storage battery and translating devices carried upon each of a plurality of units of the train and connected to said generator, a dynamo-electric machine carried upon each of said units and having the field-winding thereof arranged in circuit in series with the storage battery upon the unit of the train therewith, said dynamo-electric machine being provided with a pair of armature-windings, one of said windings being connected in circuit with the generator field-winding to regulate the strength of the generator-field and the other being connected in the circuit of the translating devices upon the unit of the train therewith to introduce a counter electromotive force into said circuit in proportion to the rise in voltage of the generator to charge the batteries.

32. In a train-lighting system, in combination, a generator receiving the power for operating the same from the motion of the train, a storage battery and translating devices arranged upon each of a plurality of units of the train and supplied with current by said generator, and an automatic regulator carried by each of said plurality of units of the train and operatively connected in circuit with the generator to confine the output thereof within prearranged limits.

33. In a train-lighting system, in combination, a generator receiving the power for operating the same from the motion of the train and carried by one of the units of the train, said generator being provided with a regulating-circuit, a storage battery and translating devices arranged upon another unit of the train and receiving current from said generator, and a dynamo-electric machine regulating said generator to confine the output thereof within prearranged limits and arranged upon the latter unit of the train, the armature of said dynamo-electric machine being connected in the regulating-circuit of the generator and the field thereof being connected in circuit with the armature of said generator.

34. In a train-lighting system, in combination, a generator receiving the power for operating the same from the motion of the train and arranged upon one of the units of the train, said generator being provided with a regulating-circuit, a storage battery and translating devices arranged upon each of a plurality of units of the train, and a dynamo-electric machine carried upon each of said plurality of units of the train and regulating the generator to confine the output thereof within prearranged limits, the armatures of said dynamo-electric machines being connected in said regulating-circuit in parallel with each other and the fields thereof being connected in circuit with the armature of said generator.

35. In a train-lighting system, in combination, a generator, a train-circuit extending through a plurality of units of the train and receiving current from said generator, a local circuit located upon each of a plurality of the units of a train, translating devices connected to each local circuit, and a dynamo-electric machine introducing a counter electromotive force into each local circuit to regulate the voltage impressed upon said translating devices by said generator.

36. In a train-lighting system, in combination, a generator receiving the power for operating the same from the motion of the train, a train-circuit extending through a plurality of units of the train and receiving current from said generator, a local circuit located upon each of a plurality of units of the train, translating devices connected to each local circuit, and a dynamo-electric machine introducing a counter electromotive force into each local circuit to regulate the voltage impressed upon said translating devices by said generator, and means automatically regulating the generator to confine the output thereof within prearranged limits.

37. In a train-lighting system, in combination, a generator receiving the power for operating the same from the motion of the train, a train-circuit extending through a plurality of units of the train and receiving current from said generator, a local circuit located upon each of said units of the train, translating devices connected to said local circuits, a dynamo-electric machine arranged upon each of said units of the train and introducing a counter electromotive force into said local circuits to regulate the voltage impressed upon said translating devices, and another dynamo-electric machine arranged upon each of said plurality of units of the train and operatively connected in circuit with the generator to confine the output thereof within prearranged limits.

38. In a train-lighting system, in combination, a generator, a local circuit located upon each of a plurality of units of the train, a train-circuit extending through said plurality of units of the train and containing two conductors receiving current from said generator, one of said conductors being looped to form a third conductor and said local circuits being connected between the other conductor and said third conductor, a storage battery and translating devices connected to each local circuit, and means regulating the voltage impressed upon said translating devices.

39. In a train-lighting system, in combination, a generator receiving the power for operating the same from the motion of the train, a local distributing-circuit located upon each of a plurality of units of the train, a train-circuit extending through said plurality of units of the train and containing two conductors receiving current from said generator, one of said conductors being looped to form a third conductor and said local circuits being connected between the other conductor and said third conductor, a storage battery and translating devices connected to each of said local circuits, an automatic regulator regulating said generator to confine the output thereof within prearranged limits, and means regulating the voltage impressed upon said translating devices.

40. In a train-lighting system, in combination, a generator carried upon one of the units of a train and receiving the power for operating the same from the motion of the train, a train-line extending through a plurality of the units of the train and containing a jumper-wire, an end feeder and a free wire, said free wire and said end feeder being connected to said generator at one end thereof and said end feeder being connected to said jumper-wire at the end thereof farthest from said generator, a local circuit located upon each of said plurality of units of the train and connected between said jumper-wire and said free wire, a storage battery and translating devices connected to each of said local circuits, an automatic regulator operatively connected in circuit with said generator to confine the output thereof within prearranged limits, and means regulating the voltage impressed upon said translating devices.

41. In a train-lighting system, in combination, a generator receiving the power for operating the same from the motion of the train, a train-circuit extending through a plurality of units of a train and receiving current from said generator, a local circuit located upon each of said units and connected to said train-circuit, a storage battery and translating devices connected to each of said local circuits, a dynamo-electric machine arranged upon each of said plurality of units of the train and operatively connected in circuit with said generator to confine the output thereof within prearranged limits, and a dynamo-electric machine connected in circuit to regulate the voltage impressed upon said translating devices.

42. In a train-lighting system, in combination, a generator receiving the power for operating the same from the motion of the train and having a regulating-circuit, a local circuit located upon each of a plurality of units of the train, a storage battery and translating devices connected to each of said local circuits, and a regulator carried upon each of said plurality of units of the train and connected in said regulating-circuit in parallel, each regulator being provided with a magnet controlling the operation thereof and connected to the local circuit upon the unit of the train therewith.

43. In a train-lighting system, in combination, a generator receiving the power for operating the same from the motion of the train and having a regulating-circuit, a local circuit located upon each of a plurality of units of the train, a storage battery and translating devices connected to each of said local circuits, a regulator carried upon each of said plurality of units of the train and connected in said regulating-circuit in parallel with each other, each regulator being provided with an electromagnet controlling the operation thereof and connected to the local circuit upon the unit of the train therewith, and means regulating the voltage impressed upon said translating devices.

44. In a train-lighting system, in combination, a generator carried by one of the units of the train and receiving the power for operating the same from the motion of the train, said generator being provided with a regulating-circuit, a train-circuit extending through a plurality of units of the train and receiving current from said generator, a local circuit located upon each of said plurality of units of the train and connected to said train-circuit, a dynamo-electric machine arranged upon each of said units of the train and having an armature connected in said regulating-circuit to regulate the output of said generator and another armature connected in circuit with the translating devices upon the unit of the train therewith to regulate the voltage impressed thereon, each dynamo-electric machine having the field thereof connected to the local circuit upon the unit of the train therewith.

45. In a train-lighting system, in combination, a generator carried by one of the units of the train and receiving the power for operating the same from the motion of the train, a train-circuit extending through a plurality of units of the train and receiving current from said generator, a local circuit located upon each of said plurality of units of the train and connected to said train-circuit, an automatic switch controlling each of said local circuits, a storage battery and translating devices connected to each of said local circuits, and a suitably-organized automatic regulator located upon each of said plurality of units of the train and serving to regulate the generator to confine the output thereof within prearranged limits and also to regulate the voltage impressed upon said translating devices.

46. In a train-lighting system, in combination, a generator carried by one of the units of the train and receiving the power for operating the same from the motion of the train, said generator being provided with a regulating-circuit, a train-circuit extending through a plurality of units of the train and receiving current from said generator, a local circuit located upon each of said plurality of units of the train and connected to said train-circuit, an automatic switch controlling each of said local circuits, a storage battery and translating devices connected to each of said local circuits, and suitably-organized dynamo-electric machines introducing a counter electromotive force into said regulating-circuit to regulate said generator to confine the output thereof within prearranged limits and also introducing a counter electromotive force into the translating branch of said local circuits to regulate the voltage impressed upon said translating devices.

47. In a train-lighting system, in combination, a generator, a local circuit located upon each of a plurality of units of the train, a train-circuit adapted to extend through said plurality of units of the train and containing two conductors receiving current from said generator, one of said conductors being looped to form a third conductor and said local circuits being connected between the other conductor and said third conductor, a storage battery and translating devices connected to each local circuit, and automatic switches controlling each local circuit and adapted to automatically disconnect said local circuits from said train-circuit.

48. In a train-lighting system, a train-driven generator carried upon one of the units of the train, a regulator carried upon another unit of the train, and a circuit coöperatively uniting said generator and regulator and comprising in part the conducting-framework of the train.

49. In a train-lighting system, a train-driven generator carried upon one of the units of the train, and a regulator carried upon another unit of the train, and a circuit coöperatively uniting said generator and regulator and comprising in part the conducting-framework of the car and the track.

50. In a train-lighting system, in combination, a generator driven at a variable speed and carried upon the tender of the locomotive, a train-line extending from said generator and passing through a plurality of cars, a local circuit arranged upon each of said cars, a storage battery and translating devices connected to each local circuit, a dynamo-electric machine carried upon each car and having the field-winding thereof arranged in series with the storage battery upon the car therewith, said dynamo-electric machine being provided with a pair of armature-windings, one of said armature-windings being adapted to be connected in circuit with the field-winding of said generator to regulate the strength of the generator-field and the other being connected in the circuit of said translating devices to regulate the voltage impressed upon the said translating devices.

51. In a train-lighting system, in combination, a generator provided with a shunt field-winding and carried upon the tender of the locomotive, a main circuit extending from said generator and passing through a plurality of cars, a local circuit arranged upon each of said cars, an automatic switch for controlling each local circuit, a storage battery and translating devices connected to each local circuit, a dynamo-electric machine carried upon each of said cars and having the field-winding thereof connected in series with the storage battery upon the car therewith, said dynamo-electric machine being provided with a pair of armature-windings, one of said windings being adapted to be connected in circuit with the field-winding of the generator to introduce a counter electromotive force into said field-circuit and the other being connected in the circuit of the translating devices upon the car therewith to regulate the voltage impressed upon said translating devices, and a motor for driving the armature of said dynamo-electric machine, said motor being connected across the local circuit upon the car therewith.

52. In a train-lighting system, in combination, a generator driven at a variable speed and provided with a shunt field-winding, a main circuit extending from said generator and passing through a plurality of cars or units, a local circuit arranged upon each of said cars or units and connected across said main circuit, an automatic switch for controlling the continuity of each local circuit, a storage battery and translating devices connected to each local circuit, an automatic regulator carried upon each car and having an electromagnetic winding arranged in circuit to control the operation thereof, said regulator being adapted to be connected in circuit with said field-winding to regulate the strength of the field of said generator, another regulator carried upon each car and connected in the circuit of the translating devices to regulate the voltage impressed upon said translating devices, said regulator being provided with an electromagnetic winding arranged in circuit to control the operation thereof.

In witness whereof I have hereunto subscribed my name in the presence of two witnesses.

WILLIAM L. BLISS.

Witnesses:
   JOHN L. BLISS,
   C. B. C. FOWLER.